(12) United States Patent
Hall et al.

(10) Patent No.: US 10,088,981 B2
(45) Date of Patent: Oct. 2, 2018

(54) USER ENGAGEMENT APPLICATION ACROSS USER INTERFACE APPLICATIONS

(71) Applicant: SAP SE, Walldorf (DE)

(72) Inventors: Christina Hall, Dielheim (DE); Anja Fehlau, Dossenheim (DE); Christian Geldmacher, Heidelberg (DE); Joerg Goeppert, Karlsruhe (DE); Sophie Kraut, Bad Schoenborn (DE); Bjoern Bader, Eppelheim (DE); Hergen Siefken, Plankstadt (DE); Klaus Herter, Leimen (DE)

(73) Assignee: SAP SE, Walldorf (DE)

( * ) Notice: Subject to any disclaimer, the term of this patent is extended or adjusted under 35 U.S.C. 154(b) by 490 days.

(21) Appl. No.: 14/982,638

(22) Filed: Dec. 29, 2015

(65) Prior Publication Data

US 2017/0185244 A1  Jun. 29, 2017

(51) Int. Cl.
*G06F 3/0482* (2013.01)
*G06F 3/0484* (2013.01)
*G06F 17/22* (2006.01)
*G06F 17/24* (2006.01)
*G06F 17/27* (2006.01)
*G06Q 10/10* (2012.01)
*G06F 9/451* (2018.01)

(52) U.S. Cl.
CPC ........ *G06F 3/0482* (2013.01); *G06F 3/04845* (2013.01); *G06F 9/451* (2018.02); *G06F 17/2247* (2013.01); *G06F 17/241* (2013.01); *G06F 17/247* (2013.01); *G06F 17/2705* (2013.01); *G06Q 10/103* (2013.01)

(58) Field of Classification Search
CPC ..................................................... G06F 3/0482
USPC ........................................................ 715/758
See application file for complete search history.

(56) References Cited

U.S. PATENT DOCUMENTS

| 6,693,652 | B1 * | 2/2004 | Barrus | G06F 3/0481 |
| | | | | 707/E17.009 |
| 7,051,072 | B2 * | 5/2006 | Stewart | G06Q 10/06 |
| | | | | 705/37 |
| 7,206,809 | B2 * | 4/2007 | Ludwig | G06Q 10/10 |
| | | | | 709/204 |

(Continued)

*Primary Examiner* — Reza Nabi
(74) *Attorney, Agent, or Firm* — Brake Hughes Bellermann LLP

(57) ABSTRACT

A computer-implemented method for communicating and collecting data across multiple applications through a single user engagement application includes displaying multiple applications and a single user engagement application in a single window. Each of the multiple applications includes a user interface and user interface data objects being displayed in the single window. The user engagement application includes a chat user interface and a collection user interface, where the chat user interface displays multiple chat threads and the collection user interface includes multiple collections of saved user interface data objects. The user engagement application is a separate and distinct application from each of the multiple applications. The method includes copying and inserting selected user interface data object into a selected chat thread in the chat user interface and posting the inserted user interface data object to the other users of the selected chat thread.

15 Claims, 8 Drawing Sheets

(56) References Cited

U.S. PATENT DOCUMENTS

| | | | | |
|---|---|---|---|---|
| 7,305,436 B2* | 12/2007 | Willis | | G06F 17/30702 707/999.007 |
| 7,761,591 B2* | 7/2010 | Graham | | G06Q 40/02 709/204 |
| 7,870,199 B2* | 1/2011 | Galli | | G06F 9/547 709/206 |
| 8,224,767 B2* | 7/2012 | Swaminathan | | G06Q 10/06 706/60 |
| 8,261,193 B1* | 9/2012 | Alur | | G06Q 10/101 715/742 |
| 8,418,074 B2* | 4/2013 | Vollrath | | G06F 9/54 715/764 |
| 9,288,171 B2* | 3/2016 | Barman | | G06Q 10/10 |
| 9,851,962 B2* | 12/2017 | Boss | | G06F 8/61 |
| 2004/0117439 A1* | 6/2004 | Levett | | G06F 9/46 709/203 |
| 2006/0080432 A1* | 4/2006 | Spataro | | H04L 12/1831 709/224 |
| 2006/0276226 A1* | 12/2006 | Jiang | | H04W 8/183 455/558 |
| 2007/0288599 A1* | 12/2007 | Saul | | G06F 3/0486 709/218 |
| 2008/0229214 A1* | 9/2008 | Hamilton | | G06Q 10/06 715/751 |
| 2009/0063995 A1* | 3/2009 | Baron | | G06Q 10/10 715/753 |
| 2010/0257451 A1* | 10/2010 | Halevi | | G06F 15/16 715/733 |
| 2010/0299625 A1* | 11/2010 | Li | | G06F 3/0481 715/777 |
| 2012/0069131 A1* | 3/2012 | Abelow | | G06Q 10/067 348/14.01 |
| 2012/0084688 A1* | 4/2012 | Robert | | G06F 3/04817 715/769 |
| 2012/0089659 A1* | 4/2012 | Halevi | | G06F 17/243 709/201 |
| 2012/0110515 A1* | 5/2012 | Abramoff | | G06F 17/30994 715/854 |
| 2012/0293844 A1* | 11/2012 | Liao | | G06T 11/60 358/474 |
| 2012/0317499 A1* | 12/2012 | Shen | | H04L 51/04 715/752 |
| 2013/0174065 A1* | 7/2013 | Dayan | | G06F 3/048 715/763 |
| 2013/0174095 A1* | 7/2013 | Dayan | | G06F 17/30882 715/835 |
| 2014/0162239 A1* | 6/2014 | Roach | | G09B 5/125 434/350 |
| 2015/0089417 A1* | 3/2015 | Dayan | | G06F 17/30882 715/765 |
| 2015/0106358 A1* | 4/2015 | Nachum | | G06F 17/30554 707/722 |
| 2015/0169147 A1* | 6/2015 | Pais | | G06F 3/0482 715/781 |
| 2016/0065648 A1* | 3/2016 | Kim | | G06F 15/0266 715/748 |
| 2016/0134568 A1* | 5/2016 | Woo | | H04L 51/02 709/206 |
| 2016/0291954 A1* | 10/2016 | Boss | | G06F 8/61 |
| 2017/0185244 A1* | 6/2017 | Hall | | G06F 3/0482 |
| 2017/0374425 A1* | 12/2017 | Disley | | G06F 3/04842 |
| 2018/0011848 A1* | 1/2018 | Spataro | | G06Q 10/10 |
| 2018/0136789 A1* | 5/2018 | Faaborg | | G06F 3/0481 |

* cited by examiner

USER ENGAGEMENT APPLICATION ACROSS USER INTERFACE APPLICATIONS

TECHNICAL FIELD

This description relates to a user engagement application across user interface applications.

BACKGROUND

Business process management and execution has matured in the on premise and as well as in cloud applications. User interface paradigms provide users a rich set of role-based user interaction models to support enterprise business scenarios. Those scenarios may be organized along departments and business partners across company internal and external business parties.

The interacting user interface models operate on corresponding business entities with focus on scalable and robust business process execution. These are the so-called structured end to end business processes.

When looking at the needs around data consistence across and to end scenarios from a customer daily work perspective, the business execution brings in a lot of ad hoc challenges. Customer individual objectives and company constraints come into play and, in fact, the major part of daily work typically takes place outside the system of record (SOR). There is a variety of engagement systems, groupware environments such as mail, task and quote to do" oriented tools and social collaboration tools that are hosting individual and unstructured people driven activities. These are the systems of user engagement (SOE). They provide freestyle people centric work pattern mainly organized as decoupled from the core business system. As a consequence, this level of business execution happens mainly decoupled from the original business data. It is desirable to develop and improve systems that combine the business SOR and the SOEs into a seamless business user experience to offer all what it takes for daily business alignment and straight execution.

SUMMARY

According to one general aspect, a computer-implemented method for communicating and collecting data across multiple applications through a single user engagement application includes executing instructions stored on a non-transitory computer-readable storage medium. The method includes displaying multiple applications and a single user engagement application in a single window, where each of the multiple applications includes a user interface and user interface data objects being displayed in the single window, the user engagement application includes a chat user interface and a collection user interface, wherein the chat user interface displays multiple chat threads including chats with one or more other users and the collection user interface comprises multiple collections of saved user interface data objects and the user engagement application is a separate and distinct application from each of the multiple applications. The method includes receiving user select input to select and insert a user interface data object from one of the multiple applications into a selected chat thread from the multiple chat threads in the chat user interface and, in response to receiving the user select input, copying and inserting the selected user interface data object into the selected chat thread in the chat user interface. The method includes receiving user send input to post the inserted user interface data object to the other users of the selected chat thread and, in response to receiving the user send input, posting the inserted user interface data object to the other users of the selected chat thread.

In another general aspect, a computer program product for communicating and collecting data across multiple application through a single user engagement application is tangibly embodied on a non-transitory computer-readable storage medium and includes instructions that, when executed by at least one computing device, are configured to cause the at least one computing device to display multiple applications and a single user engagement application in a single window. Each of the multiple applications includes a user interface and user interface data objects being displayed in the single window. The user engagement application includes a chat user interface and a collection user interface, where the chat user interface displays multiple chat threads including chats with one or more other users and the collection user interface includes multiple collections of saved user interface data objects. The user engagement application is a separate and distinct application from each of the multiple applications. The at least one computing device is caused to receive user select input to select and insert a user interface data object from one of the multiple applications into a selected chat thread from the multiple chat threads in the chat user interface and, in response to receiving the user select input, copy and insert the selected user interface data object into the selected chat thread in the chat user interface. The at least one computing device is configured to receive user send input to post the inserted user interface data object to the other users of the selected chat thread and, in response to receiving the user send input, post the inserted user interface data object to the other users of the selected chat thread.

In another general aspect, a system for communicating and collecting data across multiple application through a single user engagement application includes at least one memory including instructions and at least one processor that is operably coupled to the at least one memory and that is arranged and configured to execute the instructions that, when executed, cause the at least one processor to implement a single window, multiple applications and a single user engagement application. The multiple applications and the single user engagement application display in the single window and the single user engagement application is a separate and distinct application from each of the multiple applications. Each of the multiple applications includes a user interface and user interface data objects being displayed in the single window and the user engagement application includes a chat user interface and a collection user interface, where the chat user interface displays multiple chat threads including chats with one or more other users and the collection user interface includes multiple collections of saved user interface data objects. The user engagement application is configured to receive user select input to select and insert a user interface data object from one of the multiple applications into a selected chat thread from the multiple chat threads in the chat user interface. In response to receiving the user select input, the user engagement application is configured to copy and insert the selected user interface data object into the selected chat thread in the chat user interface. The user engagement application is configured to receive user send input to post the inserted user interface data object to the other users of the selected chat thread, and, in response to receiving the user send input, post the inserted user interface data object to the other users of the selected chat thread.

Implementations of the above computer-implemented method, the computer program product and the system may include one or more of the following features or combination of features in any combination manner or order. For example, the implementations may include displaying the posted user interface data object both in the selected chat thread in the chat user interface and in the application from which the user interface data object was selected in the single window. The implementations may include receiving user select and edit input to select and edit the user interface data object in the selected chat thread and, in response to receiving the user select and edit input, selecting and editing the user interface data object in the selected chat thread in the chat user interface.

The implementations may include exposing the user interface data objects from each of the multiple applications for selection and use within the user engagement application. The implementations may include receiving user select input to select and insert a user interface data object from one of the multiple applications into a selected collection from the multiple collection in the collection user interface, and in response to receiving the user select input, copying, inserting and saving the selected user interface data object into the selected collection in the collection user interface. The implementations may include displaying the saved user interface data object both in the selected collection in the collection user interface and in the application from which the user interface data object was selected in the single window.

The implementations may include receiving a different user interface data object from another user in the selected chat thread in the chat user interface, receiving user input to select and open the different user interface data object and, in response to receiving the user input to select and open the different user interface data object, opening the different user interface data object within the single window to enable direct manipulation of the different user interface data object by the user. The implementations may include receiving text input and user send input in a text box for the selected chat thread and, in response to receiving the text input and the user send input, posting the text input to the other users of the selected chat thread.

The details of one or more implementations are set forth in the accompanying drawings and the description below. Other features will be apparent from the description and drawings, and from the claims.

DETAILED DESCRIPTION

Figure 1:
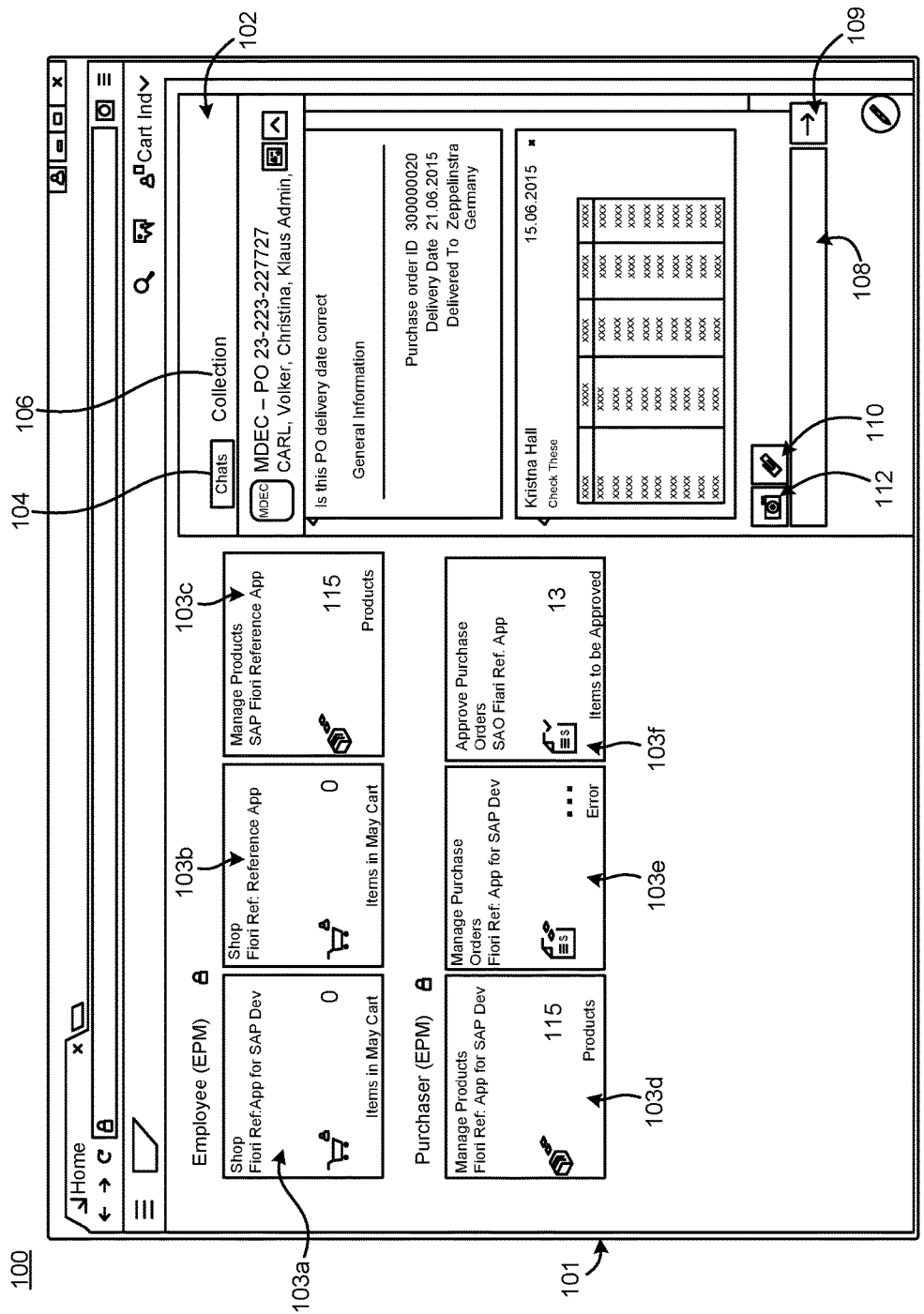
FIG. 1 is an example screenshot of a user engagement application and other applications operating together in a same window.

This document describes systems and techniques for a user engagement application that operates in combination with other user interface applications, such as other business applications. The user engagement application includes straightforward and people centric activities that operates in a same window as the user interface business data that are exposed in the user interface of the business SOR. The user engagement application offers multiple feature sets as a separate user interface right beside the user interface business data. In this manner, user engagement activities are embedded into the UI context of the SOR.

The user engagement application enables a user to identify and grab different UI business data sets (UI-BDS) within their UI representation in an application and drop the grabbed UI-BDS directly into the user engagement application. UI-BDS also may be referred to as "user interface data objects" interchangeably throughout this document. For example, the user engagement application enables the user to grab a sales order header, charts, a detail screen segment embedded in an application, and many other (UI-BDS) for embedding and sharing with other users through the user engagement application. When the UI-BDS is captured, additional UI metadata is also captured to enable the data rendering, scaling and data evaluations as may be needed and/or desired within further processing of the UI-BDS. Additionally, other media and files may be captured and dropped along with the UI-BDS in the user engagement application. The captured information may be modified and/or annotated with comments and personal notes. Other media may include document video or other references as required for business processing perspective. Additionally, multiple UI-BDS may be collected into collections and as needed for the right structuring of a particular objective within the user engagement application.

The user engagement application enables users to organize their business conversations on chats that serve as a grouping criteria with naming, timestamp and metadata. All of the collected and grabbed and dropped information discussed above may be dropped within the business conversations on the chats. The user engagement application enables communication and chats on selected UI-BDS with other colleagues and business partners of different parties. Business users may freely decide whether, when and with whom these conversations are to be shared. Invoked users get notified and requested with in particular conversations of the user engagement application. Real-time updates and dynamic triggers provide a live chat experience to allow the users to communicate synchronous or asynchronous as needed. In this manner, user engagement activities are embedded into the UI context of the SOR. The user engagement application may be integrated into other chat or social media/collaboration environments at different levels of the engagement application conversation model.

In one implementation, an extension to the UI infrastructure enables the markup and grabbing of the UI-BDS and dropping the grabbed information into a live chat interface. These UI-BDS can be associated with people engagement activities such as comments, attachments of documents, videos and other kind of media information. UI-BDS can be collected and used for communication chats with business partners. UI-BDS may be created in a private context of the acting user to take notes and to assign user individual comments as needed. UI-BDS may be collected across different UIs of the same application or UIs of different applications or business areas/domains. At the same time, each business user is free to decide whether, when and on which level of granularity the collected information needs to be exposed in order to discuss issues based on the identified UI-BDS.

A server-side engage business object model enables the storage of the grabbed UI-BDS including the data sources on a variable business data level. This data model stores a UI-BDS together with comments people communication chats, attached documents, videos or any other type of media information relevant for people centric engagement activities. Wherever a business user launches the user engagement application to collect UI-BDS within a UI, there may be only one business object model initiated to store the data while all other levels of the data model may only be invoked where the business user decides to compose multiple UI-BDS along the provided data model levels.

From a technical perspective, the work on a business issue is embedded into the SOR where the business data resides enabling the relevant UI-BDS to be grabbed. The technical implementation is a business data 1st approach to start ad hoc with people centric activities. Thus, the SOR and SOA-based activities are combined into the same system. By default, none of the business data that was collected by business user is exposed outside the business users personal perspective. The users have the complete control over all of their conversations and may modify or delete as needed from their own business perspective meaning no unwanted and hard to understand automation users have their concerns to lose control over their business conversation. Additionally, a business user may build his/her own definition of a business issue. One benefit is that such a private annotation allows smart decisions to share only some of the items of the collection while other items stay private within the owning business users local perspective.

FIG. 1 is an example screenshot 100 of a user engagement application and other applications operating together in a same window. The screenshot 100 includes a single window 101. The single window 101 includes a user engagement application 102 and other applications 103a-f. The other applications 103a-f may be represented by tiles and launched by user selection of the tiles.

The user engagement application 102 may be displayed as part of a pop over flying window that can be opened in addition to any other applications 103a-f. The positioning of the user engagement application 102 may be a flexible screen position as dragged by the user and presents the user engagement application in parallel to the current UI content. The user engagement application 102 may be launched and loaded within the same window 101 as the other applications 103a-f.

The user engagement application 102 includes options for chats 104 and collections 106. The chats tab 104 enables the user to communicate in real time with one or more other users through the chat interface. The chat message of item displays message text entered by the user for the purpose of communicating. User text may be entered in the text box 108 and when the text is sent by selection of the send button 109, the communicated message appears within the chat window 104. The chat 104 may include a visual representation of chat participants, such as an image or initials, and on-line/off-line marker, the name of the chat participant, the message text, and the timestamp. It is also possible to reference a business object from a chat.

The user engagement application 102 enables the user to grab and drop information from the other applications 103a-f. The grabbed information may be dropped directly into a chat conversation for immediate sharing with other participants of the chat. In this manner, users can grab content of their business applications and communicate and engage in business conversation directly relevant to the business content from the other applications 103a-f. Other participants in the chat conversation may directly access the content that was dropped into the conversation and sent to the other participants.

The collection tab 106 enables the user to create collections of items from the other applications 103a-f. The collection of items may be created in relation to a specific topic or certain problem that the user wants to solve using the user engagement application 102 in collaboration with other users. Each collection may include a set of items and some metadata information. The items contained in the collection can be homogeneous but can as well be heterogeneous. The existing collections can be accessed through the collection list which can be filtered and searched. A collection can contain several similar or different items including a note, an object, a chat, a quick create, a data snapshot, a system message, other messages and other items.

Collections can be private, such as to support memory and the collection and its content may be visible only to the owner. As soon as the 1st contact is invited to a collection, all items may be visible for the participant, as well as all other participants invited thereafter. A clear visual representation may be provided on the collection level and possible content level where relevant to ensure that the user is aware that the collection and contained items is private that is especially at the collection and all the contained items is now visible to participants post invitation.

A note item displays text entered by the user that may be augmented with system administrative data such as created on or created by. The text in a note item is parsed and recognized objects are highlighted and can later be added as objects to a collection. Succeeding notes that are not interrupted by other item types may be combined and are displayed as one which may be configurable to a certain time delay limit.

An object item type represents a business object inside the system. The object item type may display visual representation like an image for a product or a person, the name or identifier, the object type, additional attribute information depending on the object type such as price, address, or relation and the timestamp.

A quick create item type may be used to create an object in the user engagement application 102. A quick create item type may display a subset of fields of the original create screen of the object. The fields may include the title, the input fields needed for creation, the create button, and the open on original create screen button. The user engagement application 102 can pre-fill input fields from the context of the current page or object in the collection. After the object has been created it may be displayed as a normal object with a remark that was created with the help of a quick create.

Items may be attached to a chat 104 or a collection 106 using the attachment button 110. In this manner, objects located in other files or systems or applications that are not part of the window 101 may be attached to a chat 104 or a collection 106.

A data snapshot item type may be selected using the snapshot button 112. After selection of an area of data or content from the other applications 103a-f, the snapshot button 112 captures the selected area or selected content and incorporates it into either the chat 104 or the collection 106. A data snapshot item type includes the selected data or reference to the data, formatting information represented as a thumbnail, the system generated description and a timestamp. A lightbox or full-screen view can be triggered from the detail screen of the item as well as the possibility to navigate to the content of origin when authorized to do so.

Other features and functionality of the user engagement application 102 include the ability for the user to mix and use items as needed. Thus a set of functions are provided for all item types as relevant for the item type. For example, an item type can be copied and used either to create a new collection based on the item type or add to an existing collection.

Figure 2:
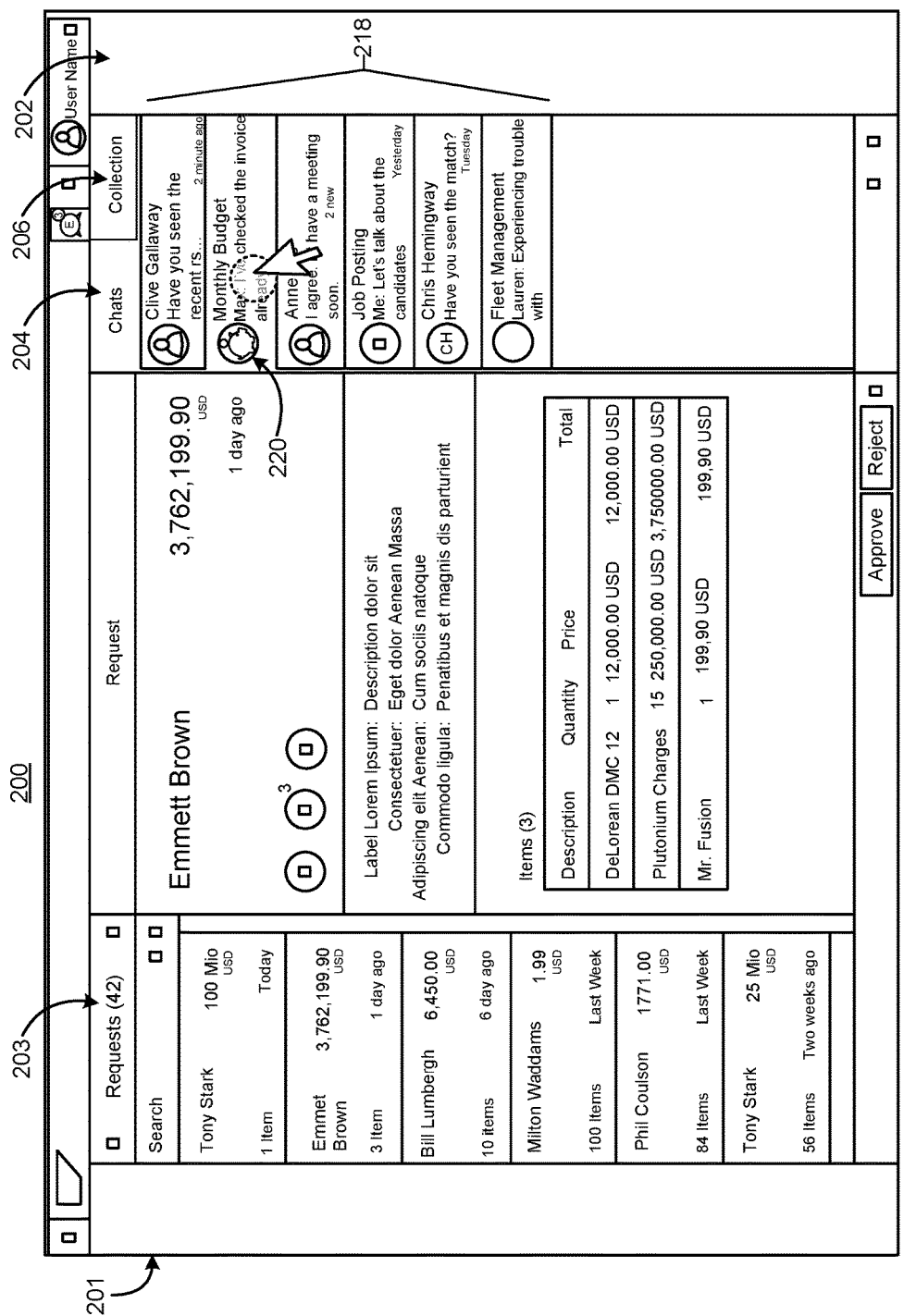
FIG. 2 is an example screenshot of a user engagement application and selection of one chat conversations from multiple conversations.

FIG. 2 is an example screenshot 200 of a user engagement application 202 and selection of one chat conversations from multiple conversations. Screenshot 200 illustrates a window 201, where the window includes the user engagement application 202 and another application 203. The user engagement application 202 includes all of the features and functionality of the user engagement application 102 of FIG. 1.

In this example, the user engagement application 202 illustrates multiple chat conversations 218 listed under the chat tab 204. The collection tab 206 is not selected thus it is not displaying anything. The user engagement application 202 enables the user to select one of the chat conversations 218. When the user selects a chat conversation such as conversation 220, then the selected conversation 220 is expanded and the details of the chat are displayed in the user engagement application 202.

Figure 3:
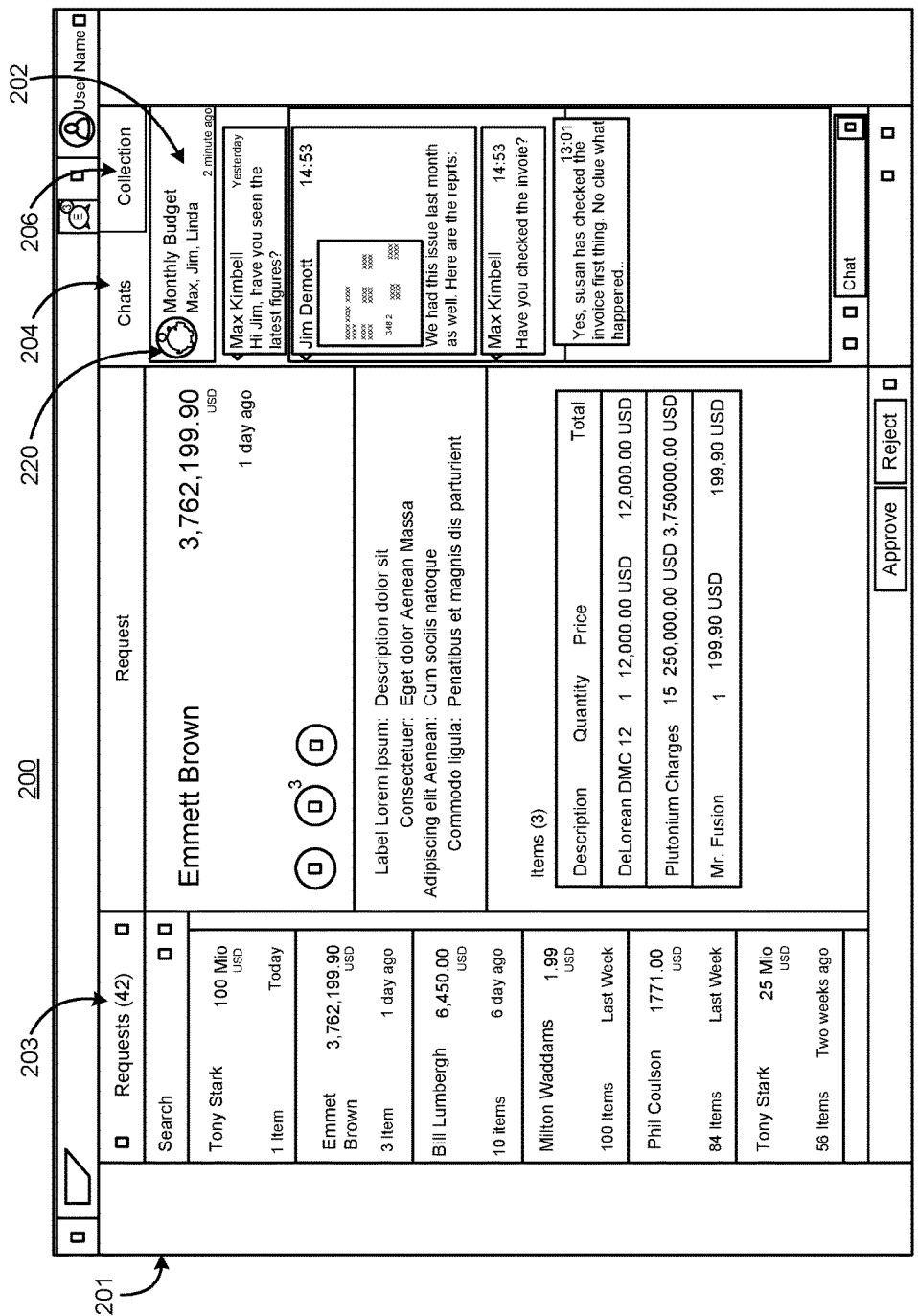
FIG. 3 is the example screenshot of FIG. 2 illustrating a selected chat conversation.

Referring to FIG. 3, the example screenshot 200 of FIG. 2 illustrates selected chat conversation 220 after the conversation has been selected. After selection, the selected chat conversation 220 opens to display the thread of messages within the chat conversation. The other chat conversations are no longer illustrated. In this manner, the user may continue a previously started chat conversation simply by selecting it from the list of conversations, which causes the selected conversation to open.

The user engagement application 202 is configured to enable a user to add one or more people to a chat conversation. For example, the user engagement application 202 may include a feature to add someone to a chat. Upon selection of the feature to add someone, and address book or contact lists may be presented from which the user may select a person to add. When the person is added to the chat conversation, the added person may view the previous chat conversation history including any objects and files that have been populated into the chat conversation from attachments and/or the other applications 203.

Figure 4:
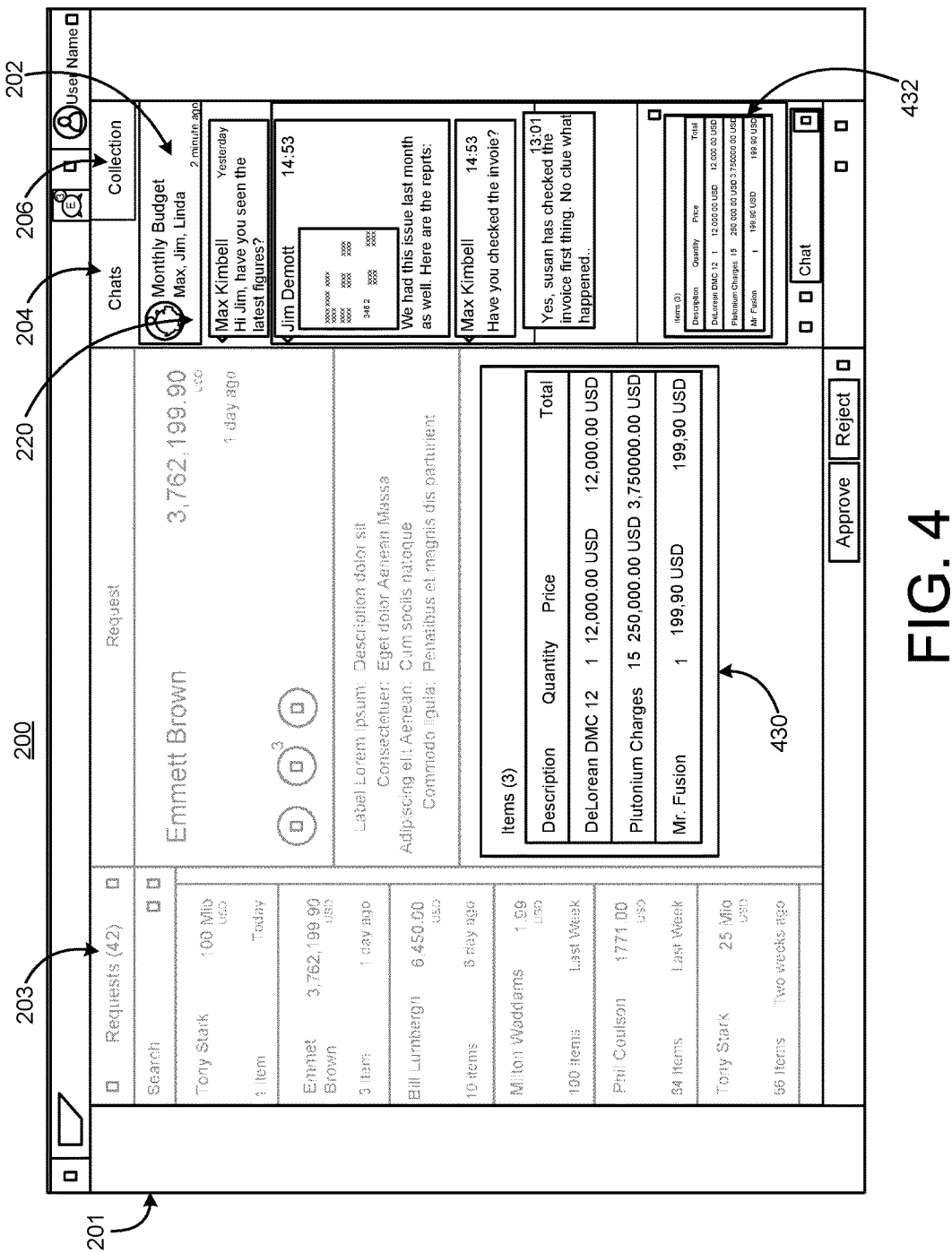
FIG. 4 is the example screenshot of FIG. 2 illustrating grabbing and dropping a UI business data set (UI-BDS) from an application into the selected chat conversation.

Referring to FIG. 4, the example screenshot 200 of FIG. 2 illustrates grabbing and dropping a UI business data set (UI-BDS) 430 from the application 203 as an object 432 in the selected chat conversation 220. In the example of FIG. 4, the user engagement application 202 enables a user to select an object also referred to as a UI-BDS 430 and drop the object into the selected chat conversation 220 as an object 432 in the message thread. Prior to grabbing and dropping the UI-BDS 430 into the chat conversation 220, the UI BDS 430 was only visible to users having the application 203 open. Once the UI-BDS 430 has been dropped as the object 432 in the selected chat conversation 220, then all members participating in the chat conversation 220 are able to at least view the UI BDS 430 as the object 432. Some users may be able to select the object 432 and launch the application 203 and manipulate and/or use the object 432 within the application 203 on their own interface. Other users may be able to select the object 432 and manipulate the object even without launching the application 203.

Figure 5:
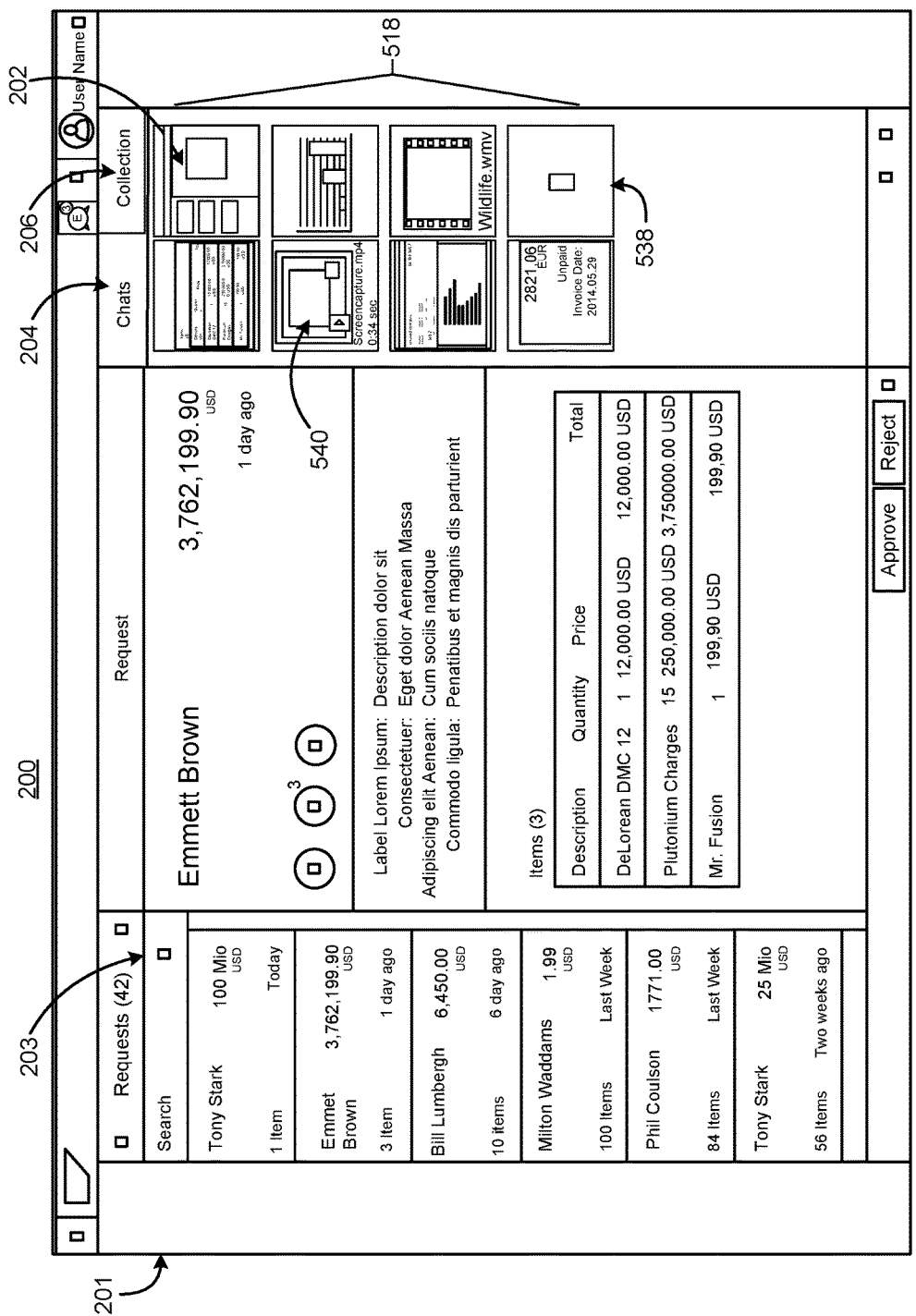
FIG. 5 is the example screenshot of FIG. 2 illustrating the collection tab.

Referring to FIG. 5, the example screenshot 200 of FIG. 2 illustrates the collection tab 206. In the collection tab 206, multiple UI-BDS 518 are illustrated, which have been saved as part of the collection. As discussed above, the UI-BDS 518 may come from the other applications 203. The UI-BDS 518 may come from more than one different application. Similar to the grab and drop concept discussed above with respect to the chat conversations, UI-BDS may be grabbed and dropped from the application 203 and saved as part of the collection documents 518.

Additionally, other mechanisms may be used to add documents and UI-BDS to the collection 518. In this example, the ad document window 538 may be used to add additional items to the collection 518. Upon selection of the ad document window 538 a pop-up selector box may appear to enable the user to either grab content from the application 203 or to upload a file from another location. Other options for adding items may appear in the pop-up selector box.

Items in the collection 518 may be selected for viewing in a larger context. For example, the user may select item 540 and upon selection, the item 540 may be displayed in a larger window. For example, the item 540 may be displayed in a window over the application 203 and next to the user engagement application 202. There may be options to expand and/or resize the item 540 after selection.

In addition to adding items to the collection 518 a user may also delete one or more of the items in the collection 518. Deleting an item from the collection 518 may remove it if the collection had been shared with other users. In this manner, all users may no longer see the deleted item. Other features may include and undo option to undelete a previously deleted item from the collection.

Figure 6:
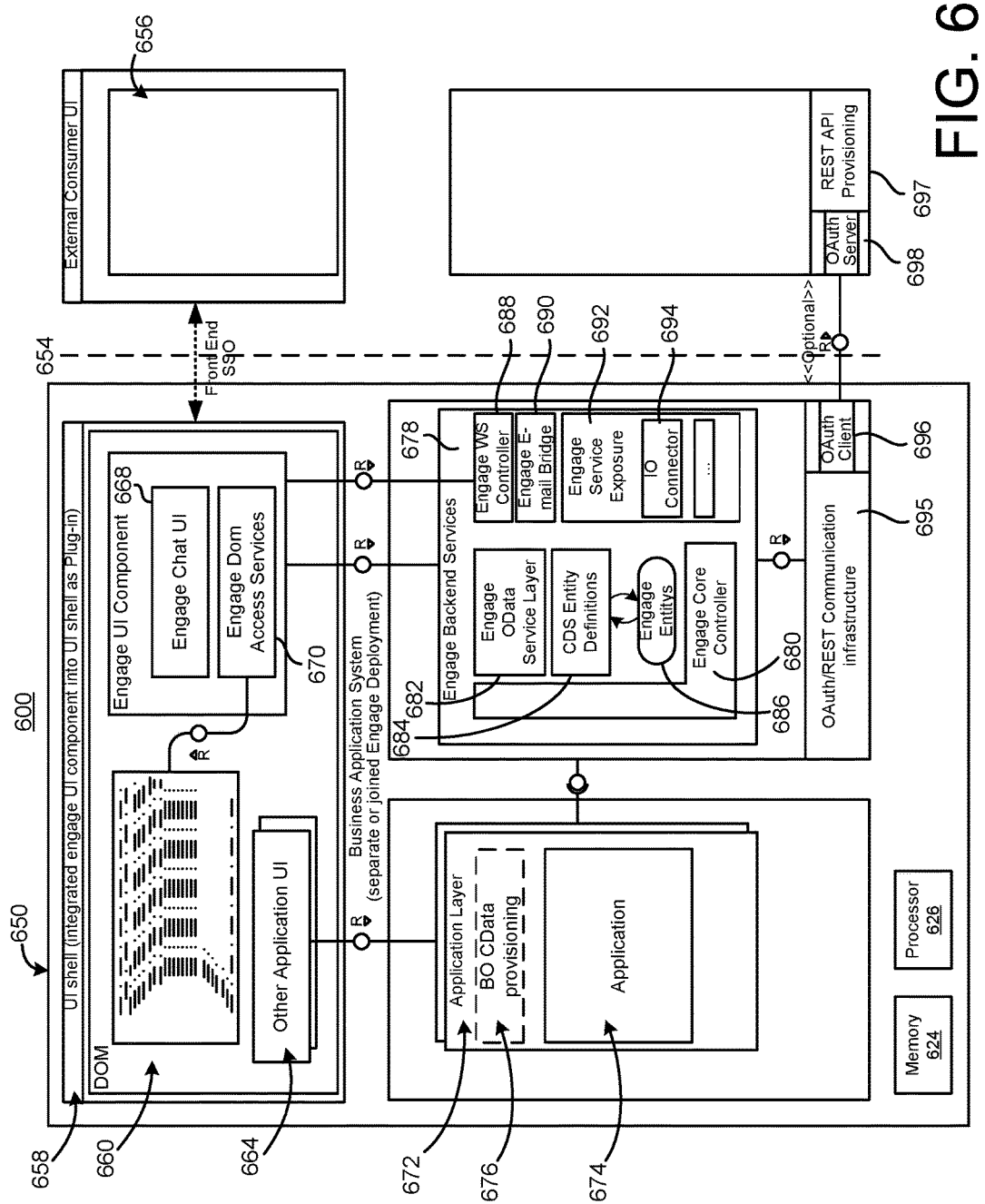
FIG. 6 is an example block diagram illustrating an example architecture for the user engagement application.

FIG. 6 is an example block diagram illustrating an example architecture system 600 for the user engagement application 102 of FIG. 1. In this example, the user engagement application also may be referred to simply as "Engage". The system 600 may be implemented on a computing device 650. The computing device 650 may be any kind of computing device capable of implementing the user engagement application. In one implementation, the computing device 650 may be a server computer running on a back end and capable of delivering the application and features over a network 654 to an external consumer UI 656. The external consumer UI 656 may be implemented on a client computing device, which may be any type of computing device including a desktop computer, a laptop, a tablet, a netbook, a smart phone and any other type of computing device capable of rendering a user interface.

The system 600 includes a user interface (UI) shell 658. The UI Shell 658 may be an integrated engage UI component into a UI shell as a plug-in. The UI Shell 658 may use a document object model (DOM) 660. The DOM 660 includes the engage UI component 662 and the other application user interfaces 664. The engage UI component 662 may correspond to the interface of the user engagement application 102 of FIG. 1 and the other application UIs 664 may correspond to the other applications 103a-f of FIG. 1. The other application UIs 664 may correspond to business applications including Fiori based business application UIs. In this manner, the DOM 660 facilitates the grabbing and dropping of UI-BDS from the other application UIs 664, including Fiori based business application UIs, into the engage UI component 662.

The engage UI component 662 includes the engage chat UI 668 and the engage DOM access services 670. The engage chat UI 668 is the interface that displays the chat interface to the user on the external consumer UI 656. The engage DOM access services 670 interfaces with the DOM 662 capture objects for input into the engage chat UI 668.

The other application UIs 664 may include web applications such as Fiori. The Fiori launchpad is a web application consisting of different UI5 controls. Each Fiori business application is integrated as a SAPUI5 UI component. Each UI component renders its content into the DOM 660 of the browser. In this architecture, the other application UIs 664, including Fiori, do not need to provide any functionality to be able to be grabbed by the engage application.

To access the DOM, the standard jQuery selectors are used. Access is possible by ID, by DOM element, by CSS class name and more complex combinations of these. A simple access via CSS class name may be used. The CSS class name may be used because the SAPUI5 controls have a distinct and not changing CSS class in the top root give of a control. The class names for selection can be maintained also in the engage back end and are provided via OData service endpoint. In case no configuration is available, the default setting for the selection class string is taken. The DOM content evaluated as "available for grabbing" is marked for selection by an overlaying popover. DOM elements available for selection can be selected by clicking on the checkbox or by other means. A selected DOM element gets cloned via jQuery.clone. During this process, the IDs of the clones get removed.

Copies of selected DOM parts may be created and stored. For rendering this copy afterwards in a browser, the result may look different of the elements may still be responsive and depend on CSS that might not be available that in one implementation, an image is generated from the copied DOM. The image may be used for displaying the grabbed content in the engage UI component 662 and furthermore allows to send it to external consumers via chat messaging or other communication means. In other implementations, the selected DOM part gets cloned in the IDs of the different tags removed. Furthermore, the style classes attached to the different DOM elements of the clone get replaced by the current computed style values. This may resolve any CSS dependencies. The prepared DOM clone gets then passed together with the canvas object of the preview area to the third-party library. The method of the library draws the DOM clone to the canvas. When the item is posted, the canvas content is converted to a blob and sent as related media item to the backend. As a last step, a thumbnail of this image could be created by scaling and resizing the canvas and sending it as a separate file to the backend.

The system architecture 600 also includes connections to other services that may be part of the business application system. The application layers 672 connects to the other application UIs 664 for rendering of the UIs for the corresponding application. The application layers 672 contain the applications 674 and the business object Odata provisioning 676. The application layers 672 include all of the features and functionalities of the applications 674.

The system 600 also includes engage back end services 678. The engage backend services 678 communicate with the engage DOM access services 670, which is part of the engage UI component 662. The engage backend services 678 include an engage core controller 680, an engage Odata service layer 682, a CDS entry definitions 684, engage entities 686, an engage WS controller 688, an engage email bridge 690 and an engage service exposure 692, which contains an I/O controller 694.

The engage backend services 678 connect to a communication infrastructure 695. In one implementation, the communication infrastructure 695 includes an on off/rest communication infrastructure. In this example, the communication infrastructure may be connected to an OAuth client 696 which provides an API provisioning 697 to the front end through OAuth server 698.

The computing device 650 includes at least one memory 624 and at least one processor 626, where the memory 624 may be a non-transitory computer-readable storage medium. Thus, the at least one processor 626 may represent two or more processors executing in parallel, and a non-transitory computer-readable storage medium 624 may represent virtually any non-transitory medium that may be used to store instructions for executing the components of the computing device 650. Multiple processors also may be referred to as multi-core processors or multi-processor core environment. The processor 626 may be a hardware processor, including a micro-processor.

The at least one processor 626 may be configured to execute instructions stored on the computer-readable storage medium 624 that, when executed, cause the at least one processor 626 to implement the UI shell 58, the application layer 672, the Engage backend services 678 and the communication infrastructure 695.

Figure 7:
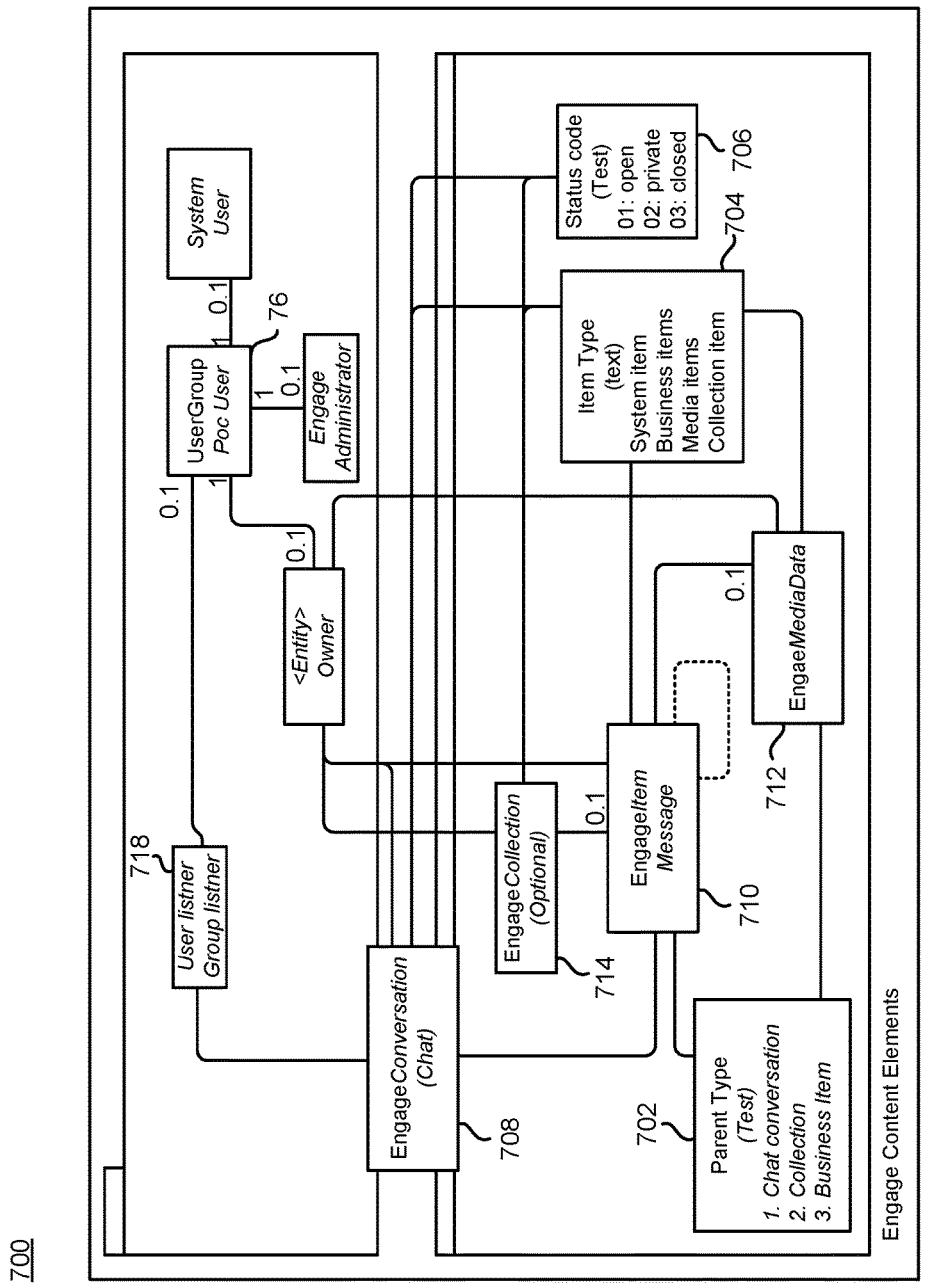
FIG. 7 is an example block diagram illustrating an example data model.

Referring to FIG. 7, an example block diagram illustrates an example data model 700. The data model 700 includes a parent type 702. The parent type 702 is a table that defines the set of those entities that are defined to act as a parent and provides the parent type text in the foreign key definition used in the parent child relationship.

The data model 700 includes an item type 704. The item type 704 is a table that is defined like the parent type table to define the existing item types and item type texts. The item type is used in the item table 2 distinct different semantics and model constraints of the item usage. At the same time new item types can be introduced over time based on new semantics.

The data model 700 includes a status code 706. The status code includes a central set of status codes that are used across the core engage entities. Along with the introduced parent and item types, the status code 706 controls the visibility of entities. The introduced set is the minimum of values that are required within the scenarios and validations while in more complex and entity specified model may be implemented.

The data model 700 also includes the conversation component 708. The conversation component provides the chat item of a chat item list. It is the parent of the message item composition relation. It is understood that the term conversation may be interchanged with the term chat.

The data model 700 also includes an item message component 710. The item message component 710 is the representation of the content where the message text, UI DOM content or media content is maintained as an attachment. Each message item is unable to exist on its own or is assigned to a single parent as a composition relationship. A same message item instance may not be reused as a child of another parent.

The data model 700 also includes a media data attachments component 712. The media data attachments component 712 is designed as a reuse entity and any entity that was relevant to carry media data assignment. Additionally, the data model 700 includes a collection component 714, a user group 716, and a user listener/group listener component 718.

Figure 8:
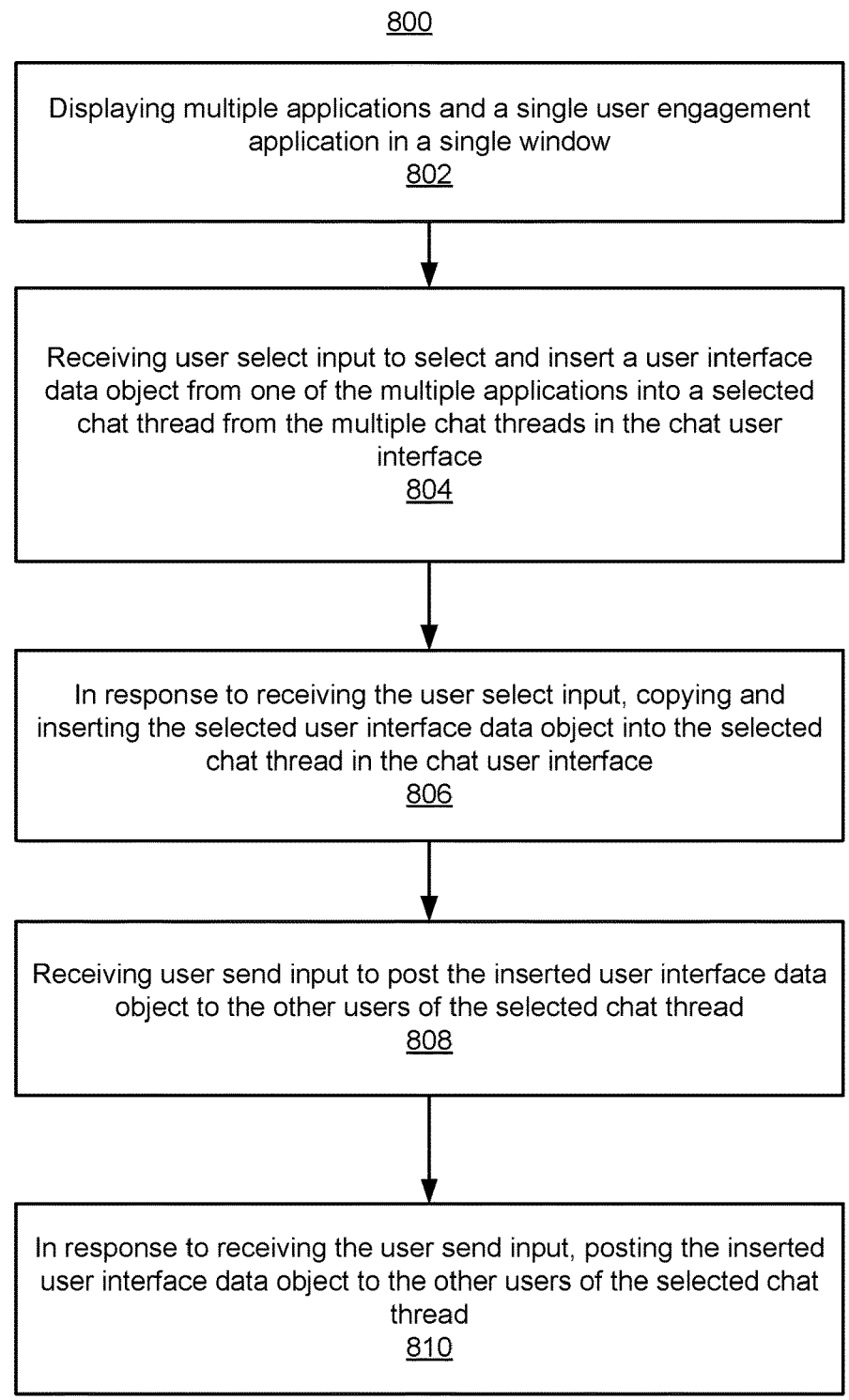
FIG. 8 is an example flowchart illustrating example operations of the architecture for the user engagement application of FIG. 6.

Referring to FIG. 8, an example process 800 illustrates example operations of the architecture of FIG. 6. Process 800 includes a computer-implemented method for communicating and collecting data across multiple applications through a single user engagement application. Process 800 includes displaying multiple applications and a single user engagement application in a single window (802). Each of the multiple applications includes a user interface and user interface data objects (or UI-BDS) being displayed in the single window. The user engagement application includes a chat user interface and a collection user interface, where the chat user interface displays multiple chat threads including chats with one or more other users and the collection user interface includes multiple collections of saved user interface data objects. The user engagement application is a separate and distinct application from each of the multiple applications.

Process 800 includes receiving user select input to select and insert a user interface data object from one of the multiple applications into a selected chat thread from the multiple chat threads in the chat user interface (804). In response to receiving the user select input, process 800 includes copying and inserting the selected user interface data object into the selected chat thread in the chat user interface (806).

Process 800 includes receiving user send input to post the inserted user interface data object to the other users of the selected chat thread (808) and, in response to receiving the user send input, posting the inserted user interface data object to the other users of the selected chat thread (810).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for communicating and collecting data across multiple applications through a single user engagement application including executing instructions stored on a non-transitory computer-readable storage medium, the method comprising:
displaying multiple applications and a single user engagement application in a single window, wherein:
each of the multiple applications includes a user interface and user interface data objects being displayed in the single window,
the user engagement application includes a chat user interface and a collection user interface, wherein the chat user interface displays multiple chat threads comprising chats with one or more other users and the collection user interface comprises multiple collections of saved user interface data objects, and
the user engagement application is a separate and distinct application from each of the multiple applications;
exposing the user interface data objects from each of the multiple applications for selection and use within the user engagement application;
receiving user select input to select and insert a user interface data object from one of the multiple applications into a selected chat thread from the multiple chat threads in the chat user interface;

in response to receiving the user select input, copying and inserting the selected user interface data object into the selected chat thread in the chat user interface;

receiving user send input to post the inserted user interface data object to the other users of the selected chat thread;

in response to receiving the user send input, posting the inserted user interface data object to the other users of the selected chat thread;

receiving user select and edit input to select and edit the user interface data object in the selected chat thread; and in response to receiving the user select and edit input, selecting and editing the user interface data object in the selected chat thread in the chat user interface.

2. The method of claim 1 further comprising displaying the posted user interface data object both in the selected chat thread in the chat user interface and in the application from which the user interface data object was selected in the single window.

3. The method of claim 1 further comprising:

receiving user select input to select and insert a user interface data object from one of the multiple applications into a selected collection from the multiple collection in the collection user interface; and in response to receiving the user select input, copying, inserting and saving the selected user interface data object into the selected collection in the collection user interface.

4. The method of claim 3 further comprising displaying the saved user interface data object both in the selected collection in the collection user interface and in the application from which the user interface data object was selected in the single window.

5. The method of claim 1 further comprising:

receiving a different user interface data object from another user in the selected chat thread in the chat user interface;

receiving user input to select and open the different user interface data object; and in response to receiving the user input to select and open the different user interface data object, opening the different user interface data object within the single window to enable direct manipulation of the different user interface data object by the user.

6. The method of claim 1 further comprising:

receiving text input and user send input in a text box for the selected chat thread; and in response to receiving the text input and the user send input, posting the text input to the other users of the selected chat thread.

7. A computer program product for communicating and collecting data across multiple application through a single user engagement application, the computer program product being tangibly embodied on a non-transitory computer-readable storage medium and comprising instructions that, when executed by at least one computing device, are configured to cause the at least one computing device to:

display multiple applications and a single user engagement application in a single window, wherein:

each of the multiple applications includes a user interface and user interface data objects being displayed in the single window, the user engagement application includes a chat user interface and a collection user interface, wherein the chat user interface displays multiple chat threads comprising chats with one or more other users and the collection user interface comprises multiple collections of saved user interface data objects, and the user engagement application is a separate and distinct application from each of the multiple applications;

expose the user interface data objects from each of the multiple applications for selection and use within the user engagement application;

receive user select input to select and insert a user interface data object from one of the multiple applications into a selected chat thread from the multiple chat threads in the chat user interface;

in response to receiving the user select input, copy and insert the selected user interface data object into the selected chat thread in the chat user interface;

receive user send input to post the inserted user interface data object to the other users of the selected chat thread;

in response to receiving the user send input, post the inserted user interface data object to the other users of the selected chat thread;

receive user select and edit input to select and edit the user interface data object in the selected chat thread; and in response to receiving the user select and edit input, select and edit the user interface data object in the selected chat thread in the chat user interface.

8. The computer program product of claim 7 further comprising instructions that, when executed by at least one computing device, are configured to cause the at least one computing device to display the posted user interface data object both in the selected chat thread in the chat user interface and in the application from which the user interface data object was selected in the single window.

9. The computer program product of claim 7 further comprising instructions that, when executed by at least one computing device, are configured to cause the at least one computing device to:

receive user select input to select and insert a user interface data object from one of the multiple applications into a selected collection from the multiple collection in the collection user interface; and in response to receiving to the user select input, copy, insert and save the selected user interface data object into the selected collection in the collection user interface.

10. The computer program product of claim 9 further comprising instructions that, when executed by at least one computing device, are configured to cause the at least one computing device to display the saved user interface data object both in the selected collection in the collection user interface and in the application from which the user interface data object was selected in the single window.

11. The computer program product of claim 7 further comprising instructions that, when executed by at least one computing device, are configured to cause the at least one computing device to:

receive a different user interface data object from another user in the selected chat thread in the chat user interface;

receive user input to select and open the different user interface data object; and in response to receiving the user input to select and open the different user interface data object, open the different user interface data object within the single window to enable direct manipulation of the different user interface data object by the user.

12. The computer program product of claim 7 further comprising instructions that, when executed by at least one computing device, are configured to cause the at least one computing device to:
  receive text input and user send input in a text box for the selected chat thread; and
  in response to receiving the text input and the user send input, post the text input to the other users of the selected chat thread.

13. A system for communicating and collecting data across multiple application through a single user engagement application, the system comprising:
  at least one memory including instructions; and
  at least one processor that is operably coupled to the at least one memory and that is arranged and configured to execute the instructions that, when executed, cause the at least one processor to implement a single window, multiple applications and a single user engagement application wherein:
    the multiple applications and the single user engagement application display in the single window and the single user engagement application is a separate and distinct application from each of the multiple applications, wherein:
      each of the multiple applications includes a user interface and user interface data objects being displayed in the single window, and
      the user engagement application includes a chat user interface and a collection user interface, wherein the chat user interface displays multiple chat threads comprising chats with one or more other users and the collection user interface comprises multiple collections of saved user interface data objects; and
    the user engagement application is configured to:
      expose the user interface data objects from each of the multiple applications for selection and use within the user engagement application;
      receive user select input to select and insert a user interface data object from one of the multiple applications into a selected chat thread from the multiple chat threads in the chat user interface;
      in response to receiving the user select input, copy and insert the selected user interface data object into the selected chat thread in the chat user interface;
      receive user send input to post the inserted user interface data object to the other users of the selected chat thread;
      in response to receiving the user send input, post the inserted user interface data object to the other users of the selected chat thread;
      receive user select and edit input to select and edit the user interface data object in the selected chat thread; and
      in response to receiving the user select and edit input, select and edit the user interface data object in the selected chat thread in the chat user interface.

14. The system of claim 13 wherein the user engagement application is configured to:
  receive user select input to select and insert a user interface data object from one of the multiple applications into a selected collection from the multiple collection in the collection user interface; and
  in response to receiving to the user select input, copy, insert and save the selected user interface data object into the selected collection in the collection user interface.

15. The system of claim 13 wherein the user engagement application is configured to:
  receive a different user interface data object from another user in the selected chat thread in the chat user interface;
  receive user input to select and open the different user interface data object; and
  in response to receiving the user input to select and open the different user interface data object, open the different user interface data object within the single window to enable direct manipulation of the different user interface data object by the user.

* * * * *